US010781795B2

(12) United States Patent
Gbadamassi et al.

(10) Patent No.: US 10,781,795 B2
(45) Date of Patent: Sep. 22, 2020

(54) METHOD AND SYSTEM FOR DETECTING A MASS IMBALANCE IN A WIND TURBINE ROTOR (71) Applicant: General Electric Company, Schenectady, NY (US)

(72) Inventors: Oladodja Achraf Gbadamassi, Greenville, SC (US); Akshay Krishnamurty Ambekar, Mauldin, SC (US); Soeren Georg, Berlin (DE)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 15/810,247

(22) Filed: Nov. 13, 2017

(65) Prior Publication Data
US 2019/0145381 A1 May 16, 2019

(51) Int. Cl.
*F03D 13/35* (2016.01)
*F03D 17/00* (2016.01)
*G01H 1/00* (2006.01)
*F03D 7/02* (2006.01)

(52) U.S. Cl.
CPC ........... *F03D 13/35* (2016.05); *F03D 7/0296* (2013.01); *F03D 17/00* (2016.05); *G01H 1/006* (2013.01); *F05B 2260/966* (2013.01); *F05B 2270/326* (2013.01); *F05B 2270/328* (2013.01); *F05B 2270/334* (2013.01); *F05B 2270/335* (2013.01); *F05B 2270/807* (2013.01)

(58) Field of Classification Search
CPC ........ F03D 13/35; F03D 17/00; F03D 7/0224; F03D 7/024; F03D 7/043; F03D 7/048; F03D 7/042; G01H 1/006
See application file for complete search history.

(56) References Cited

U.S. PATENT DOCUMENTS

| 8,261,599 | B2 | 9/2012 | Jeffrey et al. | |
|---|---|---|---|---|
| 2005/0276696 | A1* | 12/2005 | LeMieux | F03D 7/02 416/61 |
| 2008/0152493 | A1* | 6/2008 | Sundermann | F03D 80/40 416/41 |
| 2008/0247873 | A1* | 10/2008 | Egedal | F03D 7/0224 416/43 |

(Continued)

FOREIGN PATENT DOCUMENTS

| DE | 102014225638 | 6/2016 |
|---|---|---|
| EP | 1978246 | 10/2008 |

(Continued)

OTHER PUBLICATIONS

EP Search Report, 2 pages, dated Mar. 19, 2019.

*Primary Examiner* — Helen C Kwok
(74) *Attorney, Agent, or Firm* — Dority & Manning, P.A.

(57) ABSTRACT

The present disclosure is directed to a method for detecting a mass imbalance in a rotor of a wind turbine. The method includes receiving, with a computing device, sensor data indicative of an operating characteristic of the wind turbine. The method also includes determining, with the computing device, a mean amplitude of a designated frequency component of the operating characteristic. Furthermore, the method includes determining, with the computing device, when a mass imbalance is present within the rotor based on the mean amplitude of the designated frequency component.

19 Claims, 7 Drawing Sheets

(56) References Cited

U.S. PATENT DOCUMENTS

| | | | |
|---|---|---|---|
| 2009/0266160 A1* | 10/2009 | Jeffrey | G01H 1/006 73/455 |
| 2010/0119370 A1* | 5/2010 | Myhr | F03D 7/02 416/39 |
| 2010/0133828 A1* | 6/2010 | Stegemann | F03D 7/0204 290/44 |
| 2011/0036166 A1* | 2/2011 | Lenz | G01M 1/16 73/455 |
| 2011/0318165 A1* | 12/2011 | Oing | F03D 7/0296 415/118 |
| 2012/0183399 A1* | 7/2012 | Perkinson | F03D 7/0224 416/1 |
| 2012/0226485 A1* | 9/2012 | Creagh | F03D 7/048 703/7 |
| 2013/0031966 A1* | 2/2013 | Egedal | F03D 7/042 73/112.01 |
| 2013/0261819 A1 | 10/2013 | Chauvin | |
| 2015/0355044 A1* | 12/2015 | Cardinal | G01M 1/22 73/455 |
| 2016/0033580 A1* | 2/2016 | Qiao | G01R 31/343 324/765.01 |
| 2016/0237988 A1* | 8/2016 | Perley | F03D 7/0288 |
| 2016/0327024 A1* | 11/2016 | Honekamp | F03D 7/024 |
| 2018/0142676 A1* | 5/2018 | Pedersen | F03D 7/0224 |
| 2019/0072082 A1* | 3/2019 | Lysgaard | F03D 7/0204 |

FOREIGN PATENT DOCUMENTS

| | | |
|---|---|---|
| ES | 2376815 | 3/2012 |
| WO | WO2016169963 | 10/2016 |

* cited by examiner

METHOD AND SYSTEM FOR DETECTING A MASS IMBALANCE IN A WIND TURBINE ROTOR

FIELD

The present disclosure generally relates to wind turbines. More particularly, the present disclosure relates methods and systems for detecting a mass imbalance in a rotor of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and a rotor having one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

In general, when a large mass imbalance is present in the rotor, the wind turbine may experience accelerated wear. For example, large mass imbalances may result in high fatigue loads and increased side-to-side bending moments within the tower as well as large torque cycling within the drivetrain. As such, large mass imbalances may reduce the life of the various components of the wind turbine, such as the tower and/or the drivetrain. Furthermore, the mass imbalances may be amplified as the height of the tower increases and/or the stiffness of the tower decreases.

Accordingly, an improved method and system for detecting a mass imbalance in a rotor of a wind turbine would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a method for detecting a mass imbalance in a rotor of a wind turbine. The method includes receiving, with a computing device, sensor data indicative of an operating characteristic of the wind turbine. The method also includes determining, with the computing device, a mean amplitude of a designated frequency component of the operating characteristic. Furthermore, the method includes determining, with the computing device, when a mass imbalance is present within the rotor based on the mean amplitude of the designated frequency component.

In another aspect, the present disclosure is directed to a system for detecting a mass imbalance in a rotor of a wind turbine. The system includes a rotor of the wind turbine with the rotor having one or more rotor blades. The system also includes a drivetrain of the wind turbine with the drivetrain being coupled to the rotor. Furthermore, the system includes a generator of the wind turbine with the generator being coupled to the drivetrain. Additionally, the system includes a sensor in operative association with the wind turbine. The sensor is configured to detect a parameter indicative of an operating characteristic of the wind turbine. Moreover, the system includes a controller communicatively coupled to the sensor. The controller being configured to determine a mean amplitude of a designated frequency component of the operating characteristic based on sensor measurements received from the sensor. The controller is also configured to determine when a mass imbalance is present within the rotor based on the mean amplitude of the designated frequency component. Furthermore, the system is configured to, when the mass imbalance is present within the rotor, initiate a control action associated with reducing an effect of the mass imbalance on the wind turbine.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Figure 1:
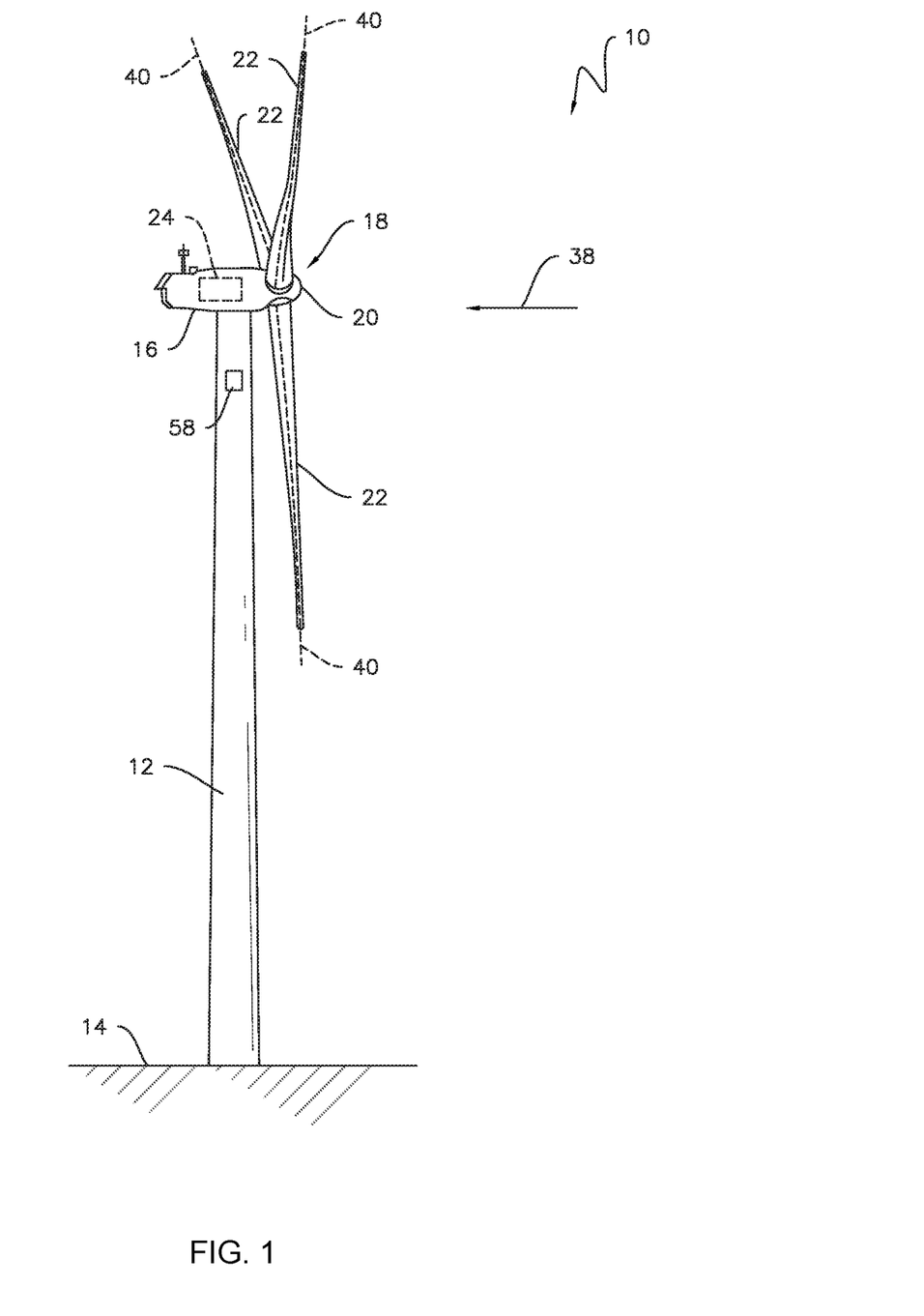
FIG. 1 is a perspective view of a wind turbine according to one embodiment of the present disclosure.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 to convert kinetic energy from the wind into usable rotational, mechanical energy. An electric generator 24 positioned in the nacelle 16 may generate electrical power from the rotational energy of the rotor 18.

Figure 2:
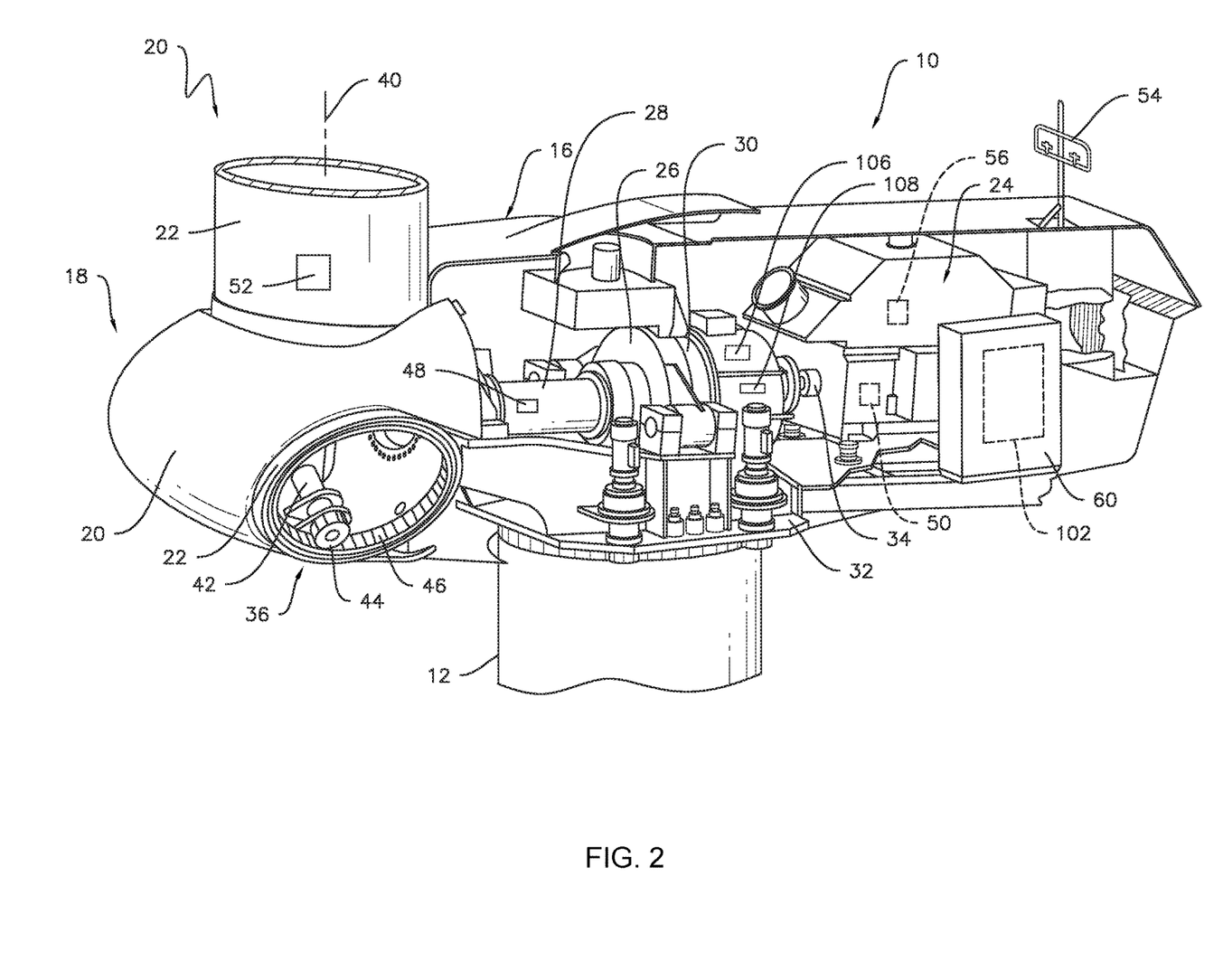
FIG. 2 is a perspective, internal view of a nacelle of a wind turbine according to one embodiment of the present disclosure.

Referring now to FIG. 2, a drivetrain 26 couples the rotor 18 to the generator 24. As shown, the drivetrain 26 may include a rotor shaft 28, which couples the rotor hub 20 to a gearbox 30. The gearbox 30 may be supported by and coupled to a bedplate 32 within the nacelle 16. The drivetrain 26 also includes a generator shaft 34, which couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input into a high speed, low torque output to drive the generator shaft 34 and, thus, the generator 24.

The wind turbine 10 may also include one or more pitch adjustment mechanisms 36. Although FIG. 2 only illustrates one pitch adjustment mechanism 36, the wind turbine 10 may include three pitch adjustment mechanisms 36. In this respect, the wind turbine 10 may include one pitch adjustment mechanism 36 corresponding to each rotor blade 22. In alternate embodiments, however, the wind turbine 10 may include more or fewer pitch adjustment mechanisms 36.

Each pitch adjustment mechanism 36 may adjust a pitch angle of the corresponding rotor blade 22 (i.e., the angular orientation of the rotor blade 22 with respect to a direction 38 (FIG. 1) of the wind). In particular, each rotor blade 22 may be rotatably coupled to the hub 20 by a pitch bearing (not shown). As such, each pitch adjustment mechanism 36 may rotate the corresponding rotor blade 22 about a corresponding pitch axis 40 relative to the hub 20, thereby adjusting the pitch angle of the rotor blade 22.

FIG. 2 illustrates an exemplary embodiment of one of the pitch adjustment mechanisms 36. More specifically, the pitch adjustment mechanism 36 may include an electric motor 42 having a pinion gear 44 coupled thereto. The pinion gear 44 may engage a ring gear 46 formed on or coupled to an inner surface of the rotor blade 22. During operation of the pitch adjustment mechanism 36, the electric motor 42 rotates the pinion gear 44. The pinion gear 44, in turn, rotates the ring gear 46, thereby rotating the rotor blade 22 about the corresponding pitch axis 40. In alternate embodiments, the pitch adjustment mechanism 36 may include any suitable type of actuator and/or any suitable structure or mechanism for transmitting the movement of the actuator to the corresponding rotor blade 22.

As shown in FIGS. 1 and 2, the wind turbine 10 may include various sensors. For example, the wind turbine 10 may include a rotor shaft position sensor 48, a generator position sensor 50, a pitch angle sensor 52, a wind velocity sensor 54, electric power sensor 56, and an acceleration sensor 58. In alternate embodiments, however, the wind turbine 10 may include only some of the sensors 48, 50, 52, 54, 56, 58 or none of the sensors 48, 50, 52, 54, 56, 58. Furthermore, the wind turbine 10 may include other sensors (e.g., vibration sensors, force sensors, load sensors, etc.) in addition to or in lieu of the sensors 48, 50, 52, 54, 56, 58.

The rotor shaft position sensor 48 may detect a rotational or azimuthal position of the rotor shaft 28. The rotational position of the rotor shaft 28 may, in turn, be used to determine the rotational position and/or the rotational velocity of the rotor 18. As shown in FIG. 2, the rotor shaft position sensor 48 is operatively associated with the rotor shaft 28. As such, the rotor shaft position sensor 48 may be a Hall Effect sensor or any other suitable type of sensor for detecting absolute or incremental rotational position and/or rotational speed.

The generator position sensor 50 may detect a rotational or azimuthal position of a component of the generator 24, such as a rotor (not shown) of the generator 24, and/or a component coupled to the generator 24, such as the generator shaft 34. The rotational position of the generator component or the component coupled to the generator 24 may, in turn, be used to determine the rotational velocity of that component. As shown in FIG. 2, the generator position sensor 50 is operatively associated with the generator 24. Although, in alternative embodiments, the generator position sensor 50 may be operatively associated with the generator shaft 34. As such, the generator position sensor 50 may be a Hall Effect sensor or any other suitable type of sensor for detecting absolute or incremental rotational position and/or rotational speed.

The pitch angle sensor 52 detects the pitch angle of the corresponding rotor blade 22. In this respect, the pitch angle sensor 52 is operatively coupled to the one of the rotor blades 22 as shown in FIG. 2. Although only one pitch angle sensor 52 is shown in FIG. 2, the wind turbine 10 may include one pitch angle sensor 52 operatively associated with each rotor blade 22. The pitch angle sensor 52 may be a Hall Effect sensor or any other suitable type of sensor for detecting absolute or incremental rotational position.

The wind speed sensor 54 detects a speed of the wind experienced by the wind turbine 10. In the embodiment in FIG. 2, the wind speed sensor 54 is mounted or otherwise coupled to the exterior of the nacelle 16. As such, the wind speed sensor 54 may be a suitable anemometer or a wind vane. In alternate embodiments, however, the wind speed sensor 54 may be a light detection and ranging (LIDAR) sensor or any other suitable type of sensor for detecting wind speed.

The electric power sensor 56 detects an electric power output of the generator 24. As shown in FIG. 2, the electric power sensor 56 is operatively associated with generator 24. As such, the electric power sensor 56 may be a suitable power encoder. In alternate embodiments, however, the electric power sensor 56 may be a suitable electric meter or any other suitable type of sensor for detecting electric power output.

The acceleration sensor 58 detects an acceleration of the tower 12 relative to the support surface 14. For example, in one embodiment, the acceleration sensor 58 may detect a side-to-side or lateral acceleration (i.e., the acceleration in a direction perpendicular to a longitudinal axis of the rotor shaft 28 and parallel to the support surface 14). Although, in other embodiments, the acceleration sensor 58 may detect acceleration in another direction. In the embodiment shown in FIG. 1, the acceleration sensor 58 is operatively associated with the tower 12. As such, the acceleration sensor 58 may be a mechanical accelerometer, a capacitive accelerometer, a piezoelectric accelerometer, or any other suitable type of acceleration sensor.

Figure 3:
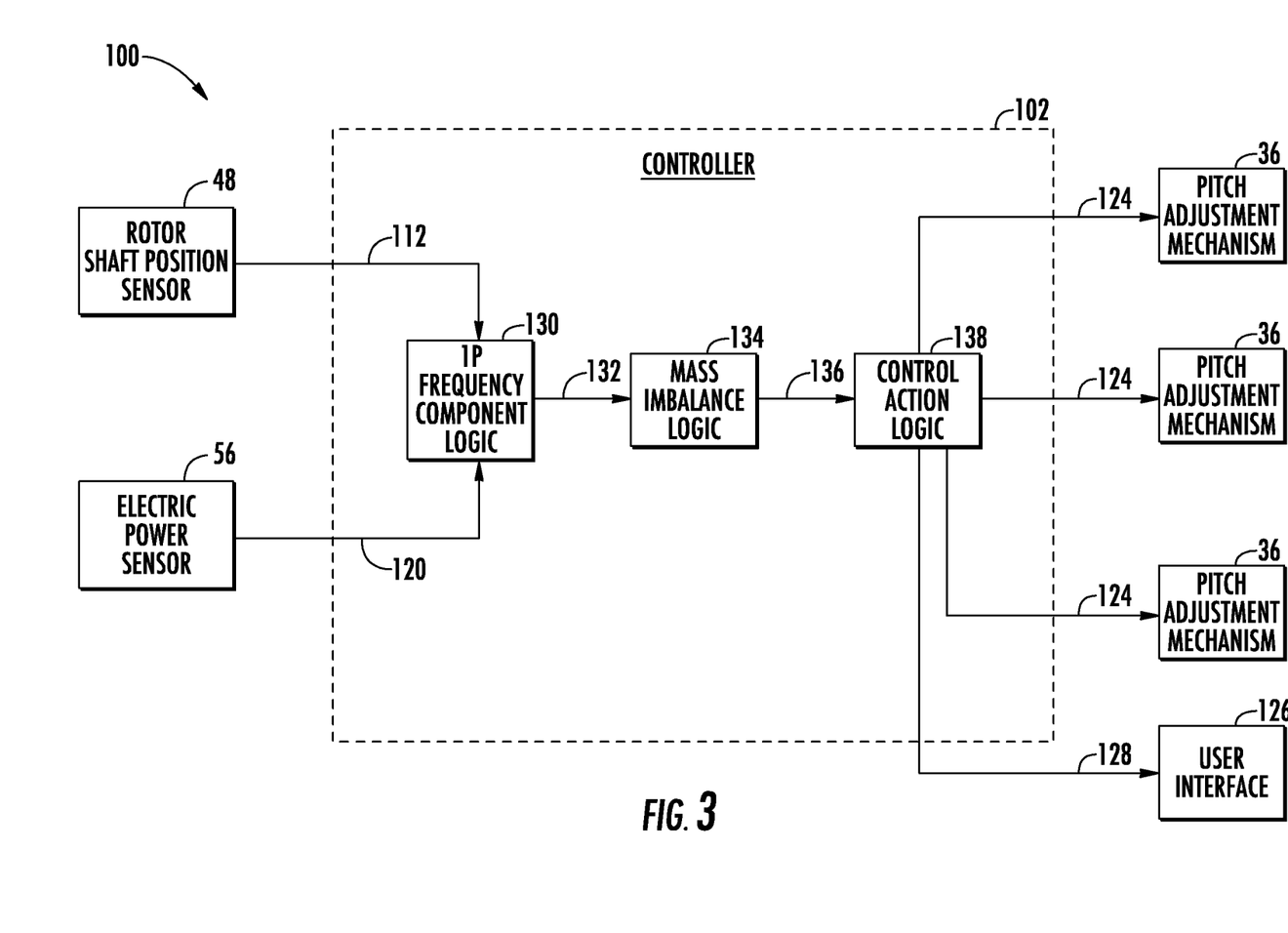
FIG. 3 is a schematic view of one embodiment of a system for detecting a mass imbalance in a rotor of a wind turbine according to one embodiment of the present disclosure.
Figure 4:
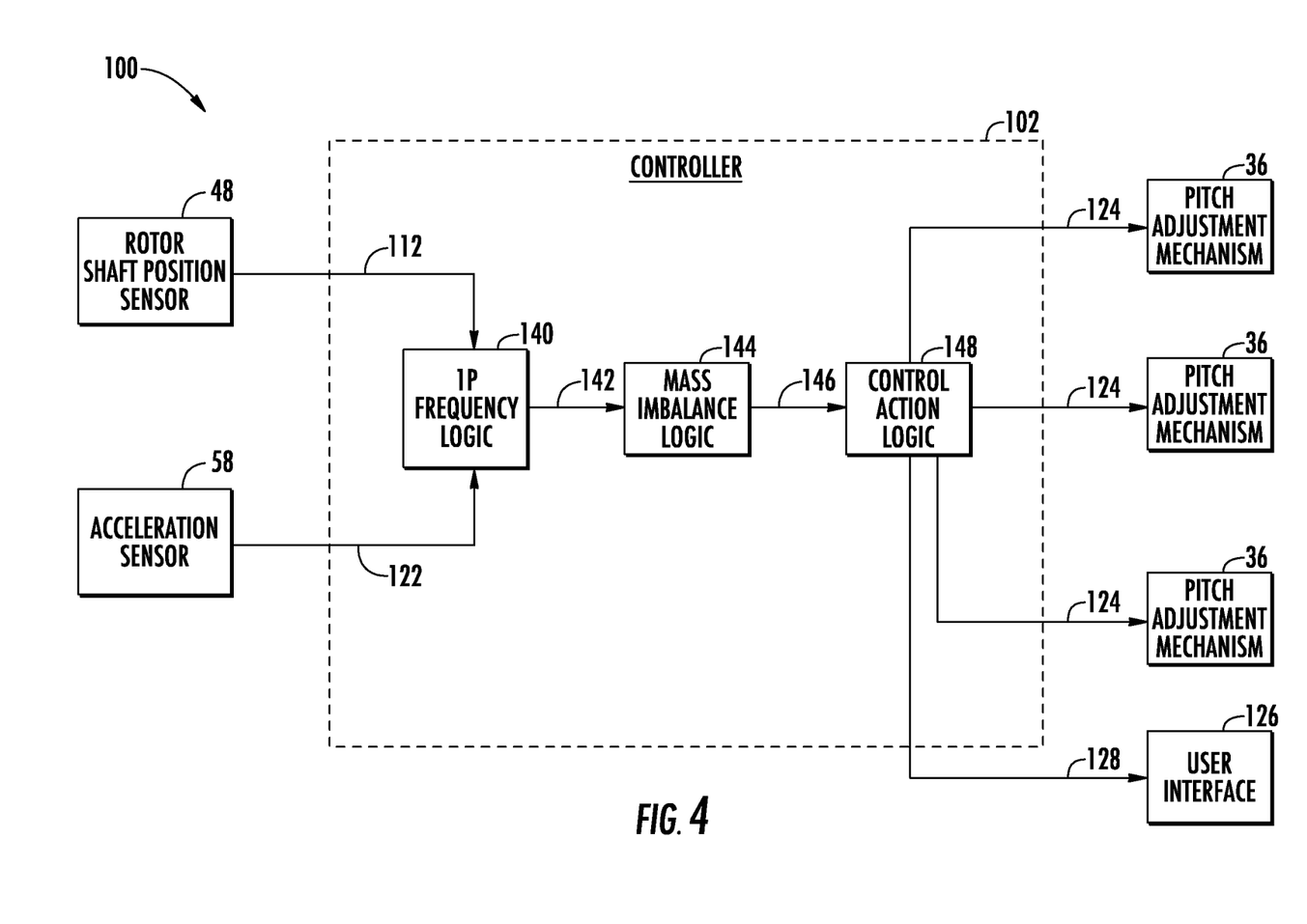
FIG. 4 is a schematic view of another embodiment of a system for detecting a mass imbalance in a rotor of a wind turbine according to one embodiment of the present disclosure.
Figure 5:
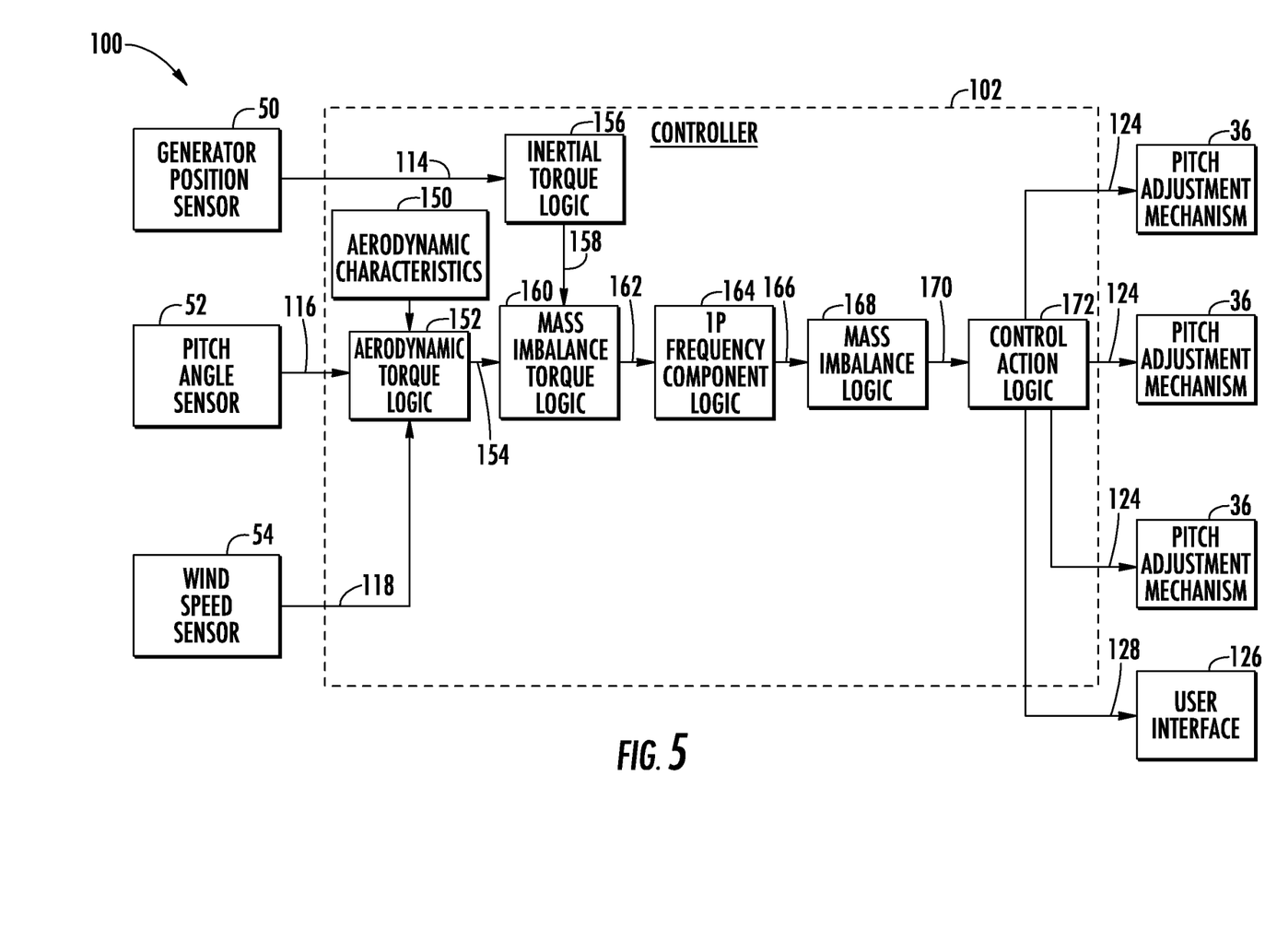
FIG. 5 is a schematic view of a further embodiment of a system for detecting a mass imbalance in a rotor of a wind turbine according to one embodiment of the present disclosure.

FIGS. 3-5 illustrate various embodiments of a system 100 for detecting a mass imbalance in a rotor of a wind turbine. In general, the system 100 will be described herein with reference to the wind turbine 10 described above and shown in FIGS. 1 and 2. Nevertheless, the disclosed system 100 may generally be used with wind turbines having any other suitable configuration.

As shown in FIGS. 3-5, the system 100 may include various components of the wind turbine 10. Specifically, the system 100 may include one or more sensors for detecting associated parameter(s) indicative of operating characteristic(s) of the wind turbine 10. For example, as shown, the system 100 may include various combinations of the rotor shaft position sensor 48, generator positions sensor 50, the pitch angle sensor 52, the wind speed sensor 54, the electric power sensor 56, and/or the acceleration sensor 58. Additionally, the system 100 may also include the pitch adjustment mechanisms 36. Nevertheless, the system 100 may include other components of the wind turbine 10 in addition to or in lieu of one or more the components 36, 48, 50, 52, 54, 56, 58.

The system 100 also includes a controller 102 communicatively coupled to one or more components of the system 100 and/or the wind turbine 10, such as one or more of the sensors 48, 50, 52, 54, 56, 58 and the pitch adjustment mechanisms 36. In the embodiment shown in FIG. 2, for example, the controller 102 is disposed within a control cabinet 60 mounted within the nacelle 16. In alternate embodiments, however, the controller 102 may be disposed at any location on or in the wind turbine 10, at any location on the support surface 14 (FIG. 1), or any other suitable location.

Figure 6:
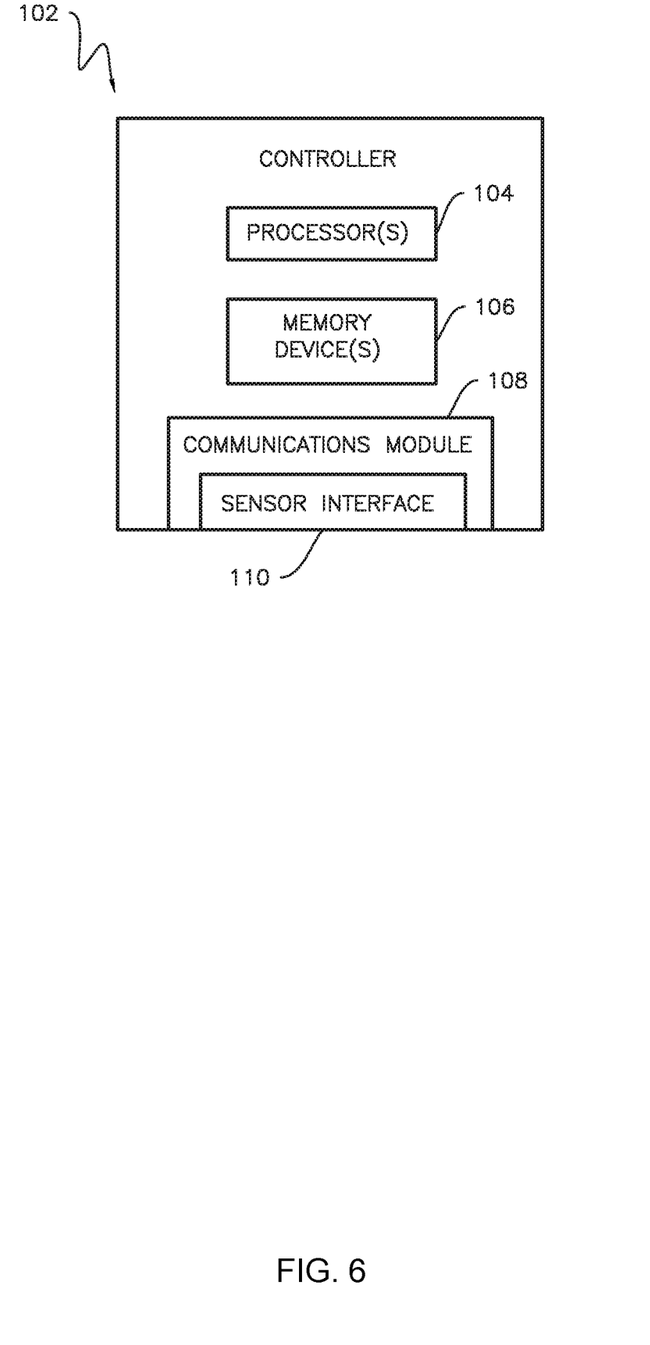
FIG. 6 is a schematic view of a controller of a system for detecting a mass imbalance in a rotor of a wind turbine according to one embodiment of the present disclosure.

In general, the controller 102 may correspond to any suitable processor-based device, including one or more computing devices. As shown in FIG. 6, for example, the controller 102 may include one or more processors 104 and one or more associated memory devices 106 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device(s) 106 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device(s) 106 may store instructions that, when executed by the processor 104, cause the processor 104 to perform functions (e.g., method 200 described below).

The controller 102 may also include a communications module 108 to facilitate communications between the controller 102 and the various components of the system 100 and/or the wind turbine 10. For example, the communications module 108 may permit the controller 102 to receive data from the sensors 48, 50, 52, 54, 56, 58. As such, the communications module 108 may include a sensor interface 110 (e.g., one or more analog-to-digital converters) that converts measurement signals 112, 114, 116, 118, 120, 122 respectively received from the sensors 48, 50, 52, 54, 56, 58 into signals that can be understood and processed by the processor(s) 104. Furthermore, the communications module 108 may permit the controller 102 to transmit control signals 124 to each pitch adjustment mechanism 36 for controlling the pitch angle of the rotor blades 22. In this respect, the communications module 108 may be any combination of suitable wired and/or wireless communication interfaces that communicatively couple the sensors 48, 50, 52, 54, 56, 58 and the pitch adjustment mechanisms 36 to the controller 102.

Referring again to FIGS. 3-5, in some embodiments, the system 100 may include a user interface 126 configured to allow interaction between a user and the controller 102. More specifically, the user interface 126 may be communicatively coupled to the controller 102 to permit feedback signals (e.g., as indicated by arrows 128 in FIGS. 3-5) to be transmitted from the controller 102 to the user interface 126. In this respect, the user interface 126 may include one or more feedback devices (not shown), such as display screens, speakers, warning lights, etc., which communicate the feedback from the controller 102 to the user. In one embodiment, the user interface 126 may be located at a remote location (e.g., a control center for a wind farm) from the wind turbine 10. In such embodiment, the controller 102 and the user interface 126 may be communicatively coupled via the Internet or another suitable network. In alternate embodiments, however, the system 100 may not include the user interface 126.

As will be described in greater detail below, the controller 102 may be configured to detect a mass imbalance in the rotor 18 by executing various logic stored on the memory device(s) 106. In particular, the controller 102 (e.g., via the processor(s) 104) executes the logic to determine a mean amplitude of a designated frequency component of an operating characteristic of the wind turbine 10 based on the data received from one or more the sensors 48, 50, 52, 54, 56, 58 and/or data stored in the memory device(s) 106. For example, the designated frequency component is a 1P frequency. In general, the mean amplitude of the 1P frequency component of an operating characteristic is indicative of a mass imbalance. That is, the mass imbalance increases proportionally with the mean amplitude of a 1P frequency component. The controller 102 (e.g., via the processor(s) 104) then executes the logic to determine when a mass imbalance is present in the rotor 18 based on the mean amplitude of the 1P frequency component. In alternative embodiments, the designated frequency component may be any other suitable frequency component. Furthermore, when the mass imbalance is present, the controller 102 may initiate various control actions associated with reducing the effect of the mass imbalance on the wind turbine 10.

FIG. 3 illustrates one embodiment of the system 100 for detecting a mass imbalance in the rotor 18 of the wind turbine 10. In the embodiment illustrated in FIG. 3, the system 100 includes the rotor shaft position sensor 48 and the electric power sensor 56. As such, the controller 102 may be configured to detect a mass imbalance in the rotor 18 based the rotational position of the rotor shaft 28 and the electric power output of the generator 24.

In such embodiment, the controller 102 may be configured to determine a mean amplitude of the 1P frequency component of the electric power output by the generator 24 based on the electric power measurement signals 120 and the rotor shaft position measurement signals 112. More specifically, as mentioned above, the controller 102 is communicatively coupled to the rotor shaft position sensor 48 and the electric power sensor 56. In this respect, the controller 102 receives rotor shaft position measurement signals (e.g., as indicated by arrows 112 in FIGS. 3-5) from the rotor shaft position sensor 48 and the electric power measurement signals (e.g., as indicated by arrows 120 in FIG. 3) from the electric power sensor 56. Furthermore, the controller 102 may include 1P frequency component logic 130 having one or more mathematical functions and/or one or more look-up tables. By executing the 1P frequency component logic 130, the controller 102 may determine a mean amplitude of the 1P frequency component (e.g., as indicated by arrow 132 in FIG. 3) of the electric power output of the generator 24 based on the electric power measurement signals 120 and rotor shaft position measurement signals 112.

In certain embodiments, for example, the controller 102 may be configured to determine the mean amplitude of the 1P frequency component of the electric power output using sine and cosine modulation. More specifically, the controller 102 may be configured to modulate the electric power measurement signals 120 based on the sine and cosine of the rotor shaft position measurement signals 112. This modulation shifts the amplitude of the 1P frequency component of the electric power measurement signals 120 from a time-dependent portion of the signals 120 to a non-time dependent portion of the signals 120. After sine and cosine modulation, the controller 102 may be configured to pass the electric power measurement signals 120 through one or more low pass filters, such as one or more first-order filters, to remove the time-dependent portions of the signals 120. After filtering, the controller 102 may be configured to extract the mean amplitude of the 1P frequency component of the electric power measurement signals 120 via a suitable mathematical function. Nevertheless, in alternative embodiments, the controller 102 may be configured to determine the mean amplitude of the 1P frequency component of the electric power output in any other suitable manner.

The controller 102 may also be configured to determine when a mass imbalance is present in the rotor 18 of the wind turbine 10 based on the 1P frequency component 132 of the electric power output of the generator 24. In general, a mass imbalance in the rotor 18 causes oscillations in the electric power measurement signals 120, which are reflected in the 1P frequency component 132. As such, the controller 102 may include mass imbalance logic 134 having one or more mathematical functions and/or one or more look-up tables. By executing the mass imbalance logic 134, the controller 102 may determine when a mass imbalance (e.g., as indicated by arrow 136 in FIG. 3) is present in the rotor 18 based on the 1P frequency component 132 of the electric power output of the generator 24. In alternative embodiments, Additionally, when the mass imbalance 136 is present in the rotor 18, the controller 102 may be configured to initiate various control actions to minimize the effect thereof on the wind turbine 10. As such, the controller 102 may include control action logic 138 having one or more mathematical functions and/or one or more look-up tables. By executing the control action logic 138, the controller 102 initiates a control action associated with reducing an effect of the mass imbalance 136 on the wind turbine 10. As will be described below, the controller 102 may be configured to initiate control actions by at least one of transmitting the feedback signals 128 to the user interface 126 or transmitting the control signals 124 to the pitch adjustment mechanisms 36. In further embodiments, however, the controller 102 may be configured to initiate control actions by transmitting control signals to any other suitable component of the wind turbine 10 and/or the system 100 (e.g., a yaw drive, braking system, etc.).

Furthermore, the controller 102 may be configured to initiate a control action associated with notifying an operator of the wind turbine 10 that the mass imbalance 136 is present within the rotor 18. For example, when the mass imbalance 136 is present, the controller 102 may be configured to transmit the feedback signals 128 to the user interface 126. The feedback signals 128 instruct the user interface 126 to present a visual or audible notification or indicator to the operator of the wind turbine 10 indicating that the mass imbalance 136 is present within the rotor 18.

Furthermore, the controller 102 may be configured to initiate a control action associated with derating the generator 24 (FIGS. 1 and 2). For example, when the mass imbalance 136 is present within the rotor 18, the controller 102 may be configured to transmit the control signals 124 to the pitch adjustment mechanisms 36. The control signals 124 instruct each pitch adjustment mechanism 36 to adjust the current pitch angle of the corresponding rotor blade 22 (FIG. 1) to a new pitch angle such that the generator 24 produces less power (i.e., is derated). Nevertheless, in alternative embodiments, the controller 102 may be configured to initiate any suitable control action associated with derating the generator 24.

Moreover, in several embodiments, the controller 102 may be configured to initiate a control action associated with terminating power generation of the generator 24 (FIGS. 1 and 2). For example, when the mass imbalance 136 is present within the rotor 18, the controller 102 may be configured to transmit the control signals 124 to the pitch adjustment mechanisms 36. The control signals 124 instruct each pitch adjustment mechanism 36 to adjust the current pitch angle of the corresponding rotor blade 22 (FIG. 1) to a feathered position such that the generator 24 ceases to produce power. Nevertheless, in such embodiments, the controller 102 may be configured to initiate any suitable control action associated with terminating power generation of the generator 24.

FIG. 4 illustrates another embodiment of the system 100 for detecting a mass imbalance in the rotor 18 of the wind turbine 10. In the embodiment illustrated in FIG. 4, the system 100 includes the rotor shaft position sensor 48 and the acceleration sensor 58. As such, the controller 102 may be configured to detect a mass imbalance in the rotor 18 based the rotational position of the rotor shaft 28 and the acceleration of the tower 12 of the wind turbine 10.

In such embodiment, the controller 102 may be configured to determine a mean amplitude of the 1P frequency component of the acceleration of the tower 12 based on the acceleration measurement signals 122 and the rotor shaft position measurement signals 112. More specifically, as mentioned above, the controller 102 is communicatively coupled to the rotor shaft position sensor 48 and the acceleration sensor 58. In this respect, the controller 102 receives the rotor shaft position measurement signals 112 from the rotor shaft position sensor 48 and the acceleration measurement signals (e.g., as indicated by arrow 122 in FIG. 4) from the acceleration sensor 58. Furthermore, the controller 102 may include 1P frequency component logic 140 having one or more mathematical functions and/or one or more look-up tables. By executing the 1P frequency component logic 140, the controller 102 may determine a mean amplitude of a 1P frequency component (e.g., as indicated by arrow 142 in FIG. 4) of the acceleration of the tower 12 based on the acceleration measurement signals 122 and the rotor shaft position measurement signals 112.

In certain embodiments, for example, the controller 102 may be configured to determine the mean amplitude of the 1P frequency component of the acceleration of the tower 12 using sine and cosine modulation. More specifically, the controller 102 may be configured to modulate the acceleration measurement signals 122 based on the sine and cosine of the rotor shaft position measurement signals 112. This modulation shifts the amplitude of the 1P frequency component of the acceleration measurement signals 122 from a time-dependent portion of the signals 122 to a non-time dependent portion of the signals 122. After sine and cosine modulation, the controller 102 may be configured to pass the acceleration measurement signals 122 through one or more low pass filters, such as one or more first-order filters, to remove the time-dependent portions of the signals 122. After filtering, the controller 102 may be configured to extract the mean amplitude of the 1P frequency component of the acceleration measurement signals 122 via a suitable mathematical function. Nevertheless, in alternative embodiments, the controller 102 may be configured to determine the mean amplitude of the 1P frequency component of acceleration of the tower 12 in any other suitable manner.

The controller 102 may also be configured to determine when a mass imbalance is present in the rotor 18 of the wind turbine 10 based on the 1P frequency component 132 of the acceleration of the tower 12. In general, a mass imbalance in the rotor 18 causes oscillations in the acceleration measurement signals 122, which are reflected in the 1P frequency component 142. As such, the controller 102 may include mass imbalance logic 144 having one or more mathematical functions and/or one or more look-up tables. By executing the mass imbalance logic 144, the controller 102 may determine when a mass imbalance (e.g., as indicated by arrow 146 in FIG. 4) is present in the rotor 18 based on the mean amplitude of the 1P frequency component 142 of the acceleration of the tower 12.

Additionally, when the mass imbalance 146 is present in the rotor 18, the controller 102 may be configured to initiate various control actions to minimize the effect thereof on the wind turbine 10. As such, the controller 102 may include control action logic 148 having one or more mathematical functions and/or one or more look-up tables. By executing the control action logic 148, the controller 102 initiates a control action associated with reducing an effect of the mass imbalance 136 on the wind turbine 10. For example, such control actions may be the same as the control actions initiated by executing the control action logic 138 described above in the context of FIG. 3. Nevertheless, in alternative embodiments, the control actions initiated by executed the control logic 148 may be different than the control actions initiated by executing the control action logic 138.

FIG. 5 illustrates a further embodiment of the system 100 for detecting a mass imbalance in the rotor 18 of the wind turbine 10. In the embodiment illustrated in FIG. 5, the system 100 includes the generator position sensor 50, the pitch angle sensor 52, and the wind speed sensor 54. As such, the controller 102 may be configured to detect a mass imbalance in the rotor 18 based the rotational position of a component of the generator 24 or the generator shaft 34, the pitch angle of the rotor blades 22, and the wind speed of wind experienced by the wind turbine 10.

In such embodiment, the controller 102 may be configured to determine an aerodynamic torque exerted on the rotor 18 based on the pitch angle measurement signals 116, the wind speed measurement signals 118, and aerodynamic characteristics 150 of the rotor 18. In one embodiment, the aerodynamic characteristic 150 may be stored in the memory device(s) 106 of the controller 102. As mentioned above, the controller 102 is communicatively coupled to the pitch angle sensor 52 and the wind speed sensor 54. In this respect, the controller 102 receives the pitch angle measurement signals (e.g., as indicated by arrow 116 in FIG. 5) from the pitch angle sensor 52 and the wind speed measurement signals (e.g., as indicated by arrow 118 in FIG. 5) from the wind speed sensor 54. Furthermore, the controller 102 may include aerodynamic torque logic 152 having one or more mathematical functions and/or one or more look-up tables. By executing the aerodynamic torque logic 152, the controller 102 may determine the aerodynamic torque (e.g., as indicated by arrow 154 in FIG. 5) exerted on the rotor 18 based on the pitch angle measurement signals 116, the wind speed measurement signals 118, and the aerodynamic characteristics 150.

The controller 102 may also be configured to determine an inertial torque exerted on the rotor 18 based on the generator position measurement signals 114. As mentioned above, the controller 102 is communicatively coupled to the generator position sensor 50. In this respect, the controller 102 receives the generator position measurement signals (e.g., as indicated by arrow 114 in FIG. 5) from the generator position sensor 50. Furthermore, the controller 102 may include inertial torque logic 156 having one or more mathematical functions and/or one or more look-up tables. By executing the inertial torque logic 156, the controller 102 may determine the inertial torque (e.g., as indicated by arrow 158 in FIG. 5) exerted on the rotor 18 based on the generator position measurement signals 114. In embodiments of the system 100 that do not include the generator position sensor 50, the controller 102 may be configured to determine the inertial torque 158 based on the rotor shaft position measurement signals 112 and a gear ratio of the gearbox 30 (FIG. 2).

Furthermore, the controller 102 may be configured to determine a mass imbalance torque exerted on the rotor 18 based on aerodynamic torque 154 and the inertial torque 158. As such, the controller 102 may include mass imbalance torque logic 160 having one or more mathematical functions and/or one or more look-up tables. By executing the imbalance torque logic 160, the controller 102 may determine the mass imbalance torque (e.g., as indicated by arrow 162 in FIG. 5) exerted on the rotor 18 based on the aerodynamic torque 154 and the inertial torque 158. For example, in one embodiment, the mass imbalance torque 162 may be determined by subtracting the inertial torque 158 from the aerodynamic torque 154.

Moreover, the controller 102 may be configured to determine a mean amplitude of the 1P frequency component of the mass imbalance torque 162. As such, the controller 102 may include 1P frequency component logic 164 having one or more mathematical functions and/or one or more look-up tables. For example, in one embodiment, the 1P frequency component logic 164 may include a 1P filter. By executing the 1P frequency component logic 164, the controller 102 may determine a mean amplitude of the 1P frequency component (e.g., as indicated by arrow 166 in FIG. 4) of the mass imbalance torque 162.

Additionally, the controller 102 may also be configured to determine when a mass imbalance is present in the rotor 18 of the wind turbine 10 based on the mean amplitude of the 1P frequency component 166 of the mass imbalance torque 162. In general, a mass imbalance in the rotor 18 causes oscillations in the mass imbalance torque 162, which are reflected in the 1P frequency component 166. As such, the controller 102 may include mass imbalance logic 168 having one or more mathematical functions and/or one or more look-up tables. By executing the mass imbalance logic 168, the controller 102 may determine when a mass imbalance (e.g., as indicated by arrow 170 in FIG. 3) is present in the rotor 18 based on the mean amplitude of the 1P frequency component 132 of the mass imbalance torque 162. Furthermore, in some embodiments, by executing the mass imbalance logic 168, the controller 102 may also determine a magnitude and/or location of the mass imbalance 170 based on the mean amplitude of the 1P frequency component 166 of the mass imbalance torque 162.

When the mass imbalance 170 is present in the rotor 18, the controller 102 may be configured to initiate various control actions to minimize the effect thereof on the wind turbine 10. As such, the controller 102 may include control action logic 172 having one or more mathematical functions and/or one or more look-up tables. By executing the control action logic 172, the controller 102 initiates a control action associated with reducing an effect of the mass imbalance 170 on the wind turbine 10. For example, such control actions may be the same as the control actions initiated by executing the control action logic 138, 148 described above in the context of FIGS. 3 and 4. Nevertheless, in alternative embodiments, the control actions initiated by executed the control logic 172 may be different than the control actions initiated by executing the control action logic 138, 148.

As mentioned above, in certain embodiments, the controller 102 may be configured to determine the magnitude and/or location of the mass imbalance 170. In such embodiments, the controller 102 may be configured to initiate particular control actions based on the determined magnitude and/or location of the mass imbalance 170. As such, in one embodiment, the controller 102 may be configured to compare the magnitude of the mass imbalance 170 to a plurality of mass imbalance thresholds and initiate specific control actions based on the particular mass imbalance threshold that the magnitude of the mass imbalance 170 exceeds. For example, the controller 102 may be configured to compare the magnitude of the mass imbalance 170 to a first mass imbalance threshold, a second mass imbalance threshold, and a third mass imbalance threshold. In general, the second mass imbalance threshold may be higher than the first mass imbalance threshold, and the third mass imbalance threshold may be higher than the second mass imbalance threshold. As such, the controller 102 may be configured to initiate a control action associated with notifying an operator of the wind turbine 10 when the magnitude of the mass imbalance 170 exceeds the first mass imbalance threshold. When the magnitude of the mass imbalance 170 exceeds the second mass imbalance threshold, the controller 102 may be configured to initiate a control action associated with derating the generator 24. Furthermore, the controller 102 may be configured to initiate a control action initiate a control action associated with terminating power generation of the generator 24 when the magnitude of the mass imbalance 170 exceeds the third mass imbalance threshold. Nevertheless, the controller 102 may be configured to initiate any suitable control action when the magnitude of the mass imbalance 170 exceeds any mass imbalance threshold.

The system 100 may be configured to detect mass imbalances when the wind turbine 10 is operating in a normal, power-generating mode and in a special, non-power-generating mode. For example, the embodiments of the system 100 that determine the presence of a mass imbalance 136, 146 based on the electric power output of the generator 24 (i.e., the embodiment shown in FIG. 3) and acceleration of the tower 12 (i.e., the embodiment shown in FIG. 4) may be used in the normal, power-generating mode. Conversely, the embodiment of the system 100 that determine the presence of a mass imbalance 170 based on the mass imbalance torque 162 may be used during special, non-power-generating mode, such as during commissioning of the wind turbine 10.

Figure 7:
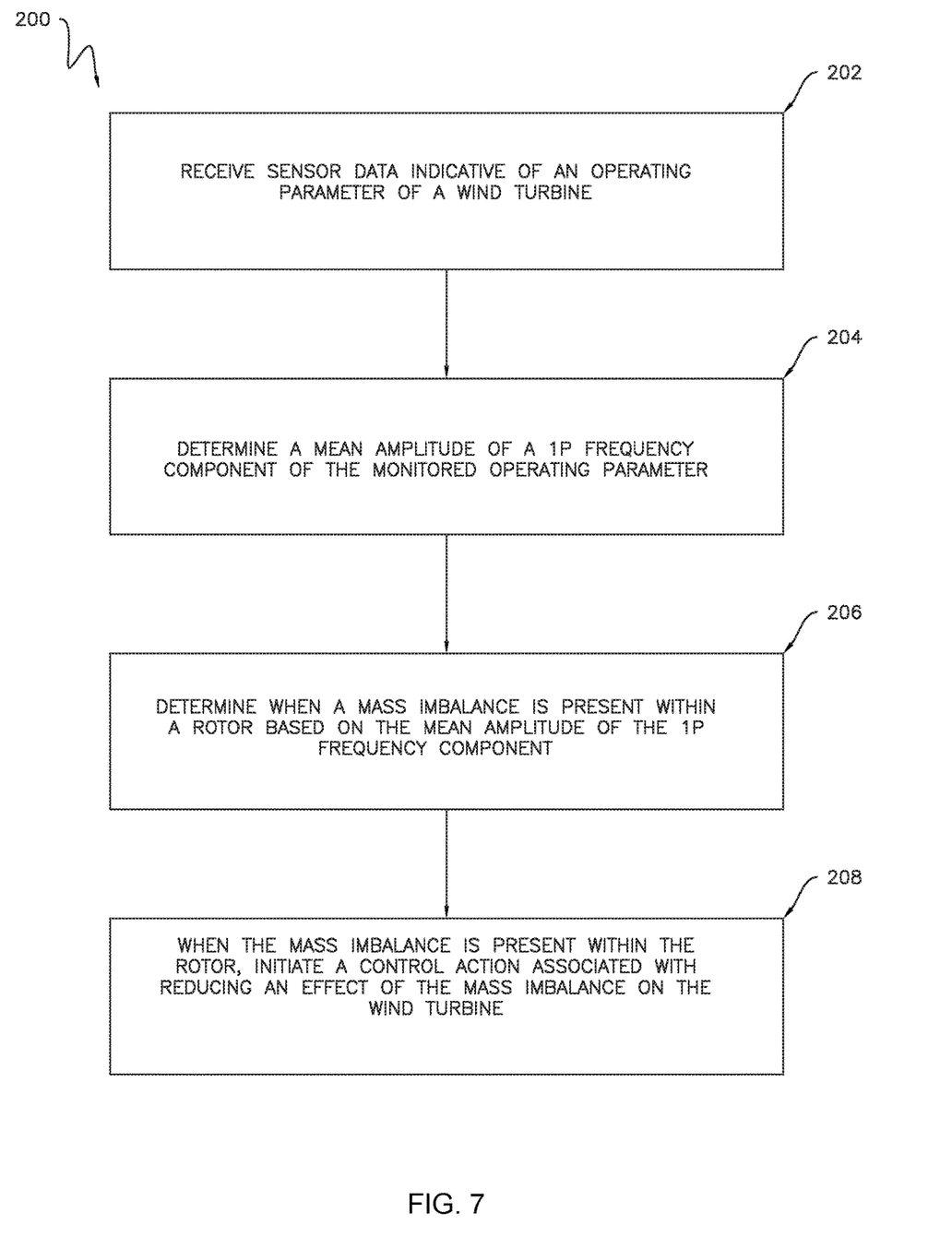
FIG. 7 is a flow chart illustrating one embodiment of a method for detecting a mass imbalance in a rotor of a wind turbine according to one embodiment of the present disclosure.

FIG. 7 illustrates one embodiment of a method 200 for monitoring wear on a gearbox of a wind turbine in accordance with aspects of the present subject matter. Although FIG. 7 depicts steps performed in a particular order for purposes of illustration and discussion, the methods discussed herein are not limited to any particular order or arrangement. As such, the various steps of the methods disclosed herein can be omitted, rearranged, combined, and/or adapted in various ways without deviating from the scope of the present disclosure.

As shown in FIG. 7, at (202), the method 200 may include receiving, with a computing device, sensor data indicative of an operating characteristic of the wind turbine. For example, as described above, the controller 102 may be communicatively coupled to various combinations of the sensors 48, 50, 52, 54, 56, 58. As such, the controller 102 may be configured to receive measurement signals 112, 114, 116, 118, 120, 122 indicative of various operating characteristics of the wind turbine 10 from the associated sensors the sensors 48, 50, 52, 54, 56, 58.

At (204), the method 200 may include determining, with the computing device, a mean amplitude of a 1P frequency component of the operating characteristic. For example, as described above, the controller 102 may be configured to execute various logic 130, 140, 164 to determine the mean amplitude of the 1P frequency component 132, 142, 166 of the operating characteristic.

Furthermore, at (206), the method 200 may include determining, with the computing device, when a mass imbalance is present within the rotor based on the mean amplitude of the 1P frequency component. For example, as described above, the controller 102 may be configured to execute various logic 134, 144, 168 to determine when the mass imbalance 136, 146, 170 is present in the rotor 18 based on the associated the mean amplitude of the 1P frequency component 132, 142, 166.

Moreover, at (208), the method 200 may include, when the mass imbalance is present within the rotor, initiating, with the computing device, a control action associated with reducing an effect of the mass imbalance on the wind turbine. For example, as described above, the controller 102 may be configured to initiate (e.g., by executing the control action logic 138, 148, 172) a control action associated with reducing the effect of the mass imbalance 136, 146, 170 on the wind turbine 10. Such control actions may include notifying an operator of the wind turbine 10, derating the generator 24 of the wind turbine 10, and/or terminating power generation of the wind turbine 10.

The disclosed system 100 and method 200 for detecting a mass imbalance within a rotor of a wind turbine provide various technical advantages. For example, the system 100 and the method 200 require only sensors that are generally already present on the wind turbine 10. Furthermore, the system 100 and the method 200 may be used when the wind turbine 10 is in a power-generating mode or a non-power-generating mode. Additionally, the system 100 and the method 200 facilitate increased tower height and/or decreased tower stiffness.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for detecting a mass imbalance in a rotor of a wind turbine, the method comprising:
   receiving, with a computing device, sensor data indicative of an electric power output of a generator of the wind turbine;
   determining, with the computing device, a mean amplitude of a designated frequency component of the electric power output;
   determining, with the computing device, when a mass imbalance is present within the rotor based on the mean amplitude of the designated frequency component; and,
   when the mass imbalance is present within the rotor, initiating, with the computing device, a control action associated with reducing an effect of the mass imbalance on the wind turbine.

2. The method of claim 1, wherein the designated frequency component comprises a 1P frequency component of the electric power output.

3. The method of claim 1, wherein determining the mean amplitude of the designated frequency component of the electric power output comprises determining the mean amplitude of the designated frequency component of the electric power output based on an azimuth position of the rotor.

4. The method of claim 1, wherein determining when the mass imbalance is present comprises determining, with the computing device, when the mass imbalance is present as the wind turbine is being operated in a power-generating mode.

5. The method of claim 1, wherein determining when the mass imbalance is present comprises determining, with the computing device, when the mass imbalance is present as the wind turbine is being operated in a non-power-generating mode.

6. The method of claim 1, wherein initiating the control action comprises derating, with the computing device, an electric power output of a generator of the wind turbine.

7. A system for detecting a mass imbalance in a rotor of a wind turbine, the system comprising:
   a rotor of the wind turbine, the rotor including one or more rotor blades;
   a drivetrain of the wind turbine, the drivetrain being coupled to the rotor;
   a generator of the wind turbine, the generator being coupled to the drivetrain;
   a sensor in operative association with the wind turbine, the sensor being configured to detect a parameter indicative of an electric power output of the generator; and,
   a controller communicatively coupled to the sensor, the controller being configured to:
   determine a mean amplitude of a designated frequency component of the electric power output based on sensor measurements received from the sensor; and
   determine when a mass imbalance is present within the rotor based on the mean amplitude of the designated frequency component.

8. The system of claim 7, wherein the designated frequency component comprises a 1P frequency component of the electric power output.

9. The system of claim 7, wherein the sensor comprises an electric power sensor in operative association with the generator, the electric power sensor being configured to detect the parameter indicative of the electric power output of the generator.

10. The system of claim 7, wherein the controller is configured to determine the mean amplitude of the designated frequency component of the electric power output based on a rotational position of the rotor.

11. The system of claim 7, wherein the sensor comprises a wind speed sensor, the wind speed sensor being configured to detect a parameter indicative of a wind speed of wind experienced by the wind turbine, the wind speed being indicative of a mass imbalance torque of the wind turbine.

12. The system of claim 11, wherein the controller is further configured to:
   determine an aerodynamic torque exerted on the rotor based on the wind speed of wind experienced by the wind turbine and a pitch angle of one or more of the rotor blades of the rotor; and,
   determine the mass imbalance torque based on the aerodynamic torque and an inertial torque.

13. The system of claim 11, wherein the controller is further configured to determine at least one of an amount or a location of the mass imbalance based on the mean amplitude of the designated frequency component of the mass imbalance torque.

14. The system of claim 7, wherein the controller is further configured to determine when the mass imbalance is present as the wind turbine is being operated in a power-generating mode.

15. The system of claim 7, wherein the controller is further configured to determine when the mass imbalance is present as the wind turbine is being operated in a non-power-generating mode.

16. A method for detecting a mass imbalance in a rotor of a wind turbine, the method comprising:
   receiving, with a computing device, sensor data indicative of a mass imbalance torque of the wind turbine;
   determining, with the computing device, a mean amplitude of a designated frequency component of the mass imbalance torque;
   determining, with the computing device, when a mass imbalance is present within the rotor based on the mean amplitude of the designated frequency component; and,
   when the mass imbalance is present within the rotor, initiating, with the computing device, a control action associated with reducing an effect of the mass imbalance on the wind turbine.

17. The method of claim 16, further comprising:
   determining, with the computing device, an aerodynamic torque exerted on the rotor based on a wind speed of wind experienced by the wind turbine and a pitch angle of one or more rotor blades of the rotor; and, determining, with the computing device, the mass imbalance torque based on the aerodynamic torque and an inertial torque.

18. The method of claim 16, further comprising:
determining, with the computing device, at least one of an amount or a location of the mass imbalance based on the mean amplitude of the designated frequency component of the mass imbalance torque.

19. The method of claim 18, wherein receiving sensor data indicative of the mass imbalance torque comprises receiving, with the computing device, the sensor data from at least one of a generator position sensor, a pitch angle sensor, or a wind speed sensor.

* * * * *